United States Patent Office 3,153,002
Patented Oct. 13, 1964

3,153,002
POLYMERS OF ORGANIC POLYISOCYANATES AND POLYETHER POLYOLS DERIVED FROM SUCROSE AND METHODS FOR THE PREPARATION THEREOF
Marco Wismer and Louis R. Lebras, Gibsonia, John R. Peffer, Verona, and James F. Foote, Sarver, Pa., assignors to Pittsburgh Plate Glass Company, a corporation of Pennsylvania
No Drawing. Filed Aug. 12, 1959, Ser. No. 833,143
15 Claims. (Cl. 260—2.5)

This invention relates to the preparation of novel polyurethane foams and to the preparation of polyols which are useful in such materials.

Low density foams of high technical merit have heretofore been prepared by reacting a high molecular weight polyol and an organic diisocyanate, such as toluene diisocyanate, under appropriate conditions to liberate and entrap a gas in the form of minute bubbles. According to one method, the polyol and the diisocyanate components are reacted in the presence of water to liberate carbon dioxide, in situ, and concurrently to cross-link the polyol molecules to form a solid resin in which the gas is estrapped as minute bubbles to provide a foam structure.

A further method of more recent development comprises reacting a polyol and a compound containing isocyanate groups in the absence of water, but in the presence of a nonreactive component such as a volatile halocarbon, such as monofluorotrichloromethane, which under conditions existing in the reaction mixture is volatilized to produce bubbles that become permanently entrapped as the mixture reacts to provide a foam structure.

High molecular weight polyols which have been suggested for the purpose, have comprised polyesters of dicarboxylic acid and polyols such as the glycols or higher polyols, such as glycerol, trimethylolethane, pentaerythritol, or mixtures of a glycol and one of the higher polyols.

Usually, in forming the polyesters for use in the preparation of foams, a considerable excess of polyols above equivalency with respect to the dicarboxylic acid is employed, thus assuring an excess of hydroxyl groups in the polyester. The latter react with the (—N=C=O) group to provide urethane linkages joining polyester molecules together in high molecular weight structures having resinous properties. If water is present in the reaction mixture, this also reacts with the toluene diisocyanate to liberate carbon dioxide gas which is entrapped as minute bubbles in the resin as it solidifies, thus providing a very light weight foam of excellent cell structure.

One serious objection to the use of polyesters of the foregoing type in forming polyurethane resins and notably the foamed type of resins, has resided in the cost of the materials. Both the polycarboxylic acid components and the polyol component are expensive, thus placing a serious handicap on the polyurethane foams as compared with other types of foams, such as polystyrene foams.

The present invention contemplates the provision of novel polyols and novel polyurethane resins, and particularly of foamed polyurethane resins from a polyol which is derived from sucrose. Commercial cane sugar is satisfactory to be used because it is essential pure sucrose. Sucrose per se is not satisfactory for reaction with polyisocyanates, such as toluene diisocyanate, in order to form polyurethane resins. This is due to mutual lack of solubility of the two materials. However, it has now been observed that by reacting sucrose, preferably in the presence of water or steam, with a low molecular weight alkylene oxide, such as ethylene oxide or propylene oxide, reaction products which are of a molecular weight of about 700 to about 1800, are liquid, of low volatility, and which are readily compatible with isocyanates, such as toluene diisocyanate, are obtained. These will react with the latter to form polyurethane products. These products, if formed under proper conditions, will be cellulated and constitute foams of excellent characteristics, as for instance, with respect to strength, low heat transfer properties, good gas retention, and other valuable properties. These products are particularly useful because of the low cost of the surcrose and the alkylene oxide going into the sucrose molecule. The polyols are liquids or are fusible and are adequately viscous to retain gases as bubbles, and do not require further modification with dicarboxylic acids such as phthalic acid, for purposes of providing long chain polyol molecules.

The replacement of the active hydrogen of the hydroxyl groups of sucrose by reaction of the same with ethylene oxide or propylene oxide, when carried to completion would provide as its main component the structure:

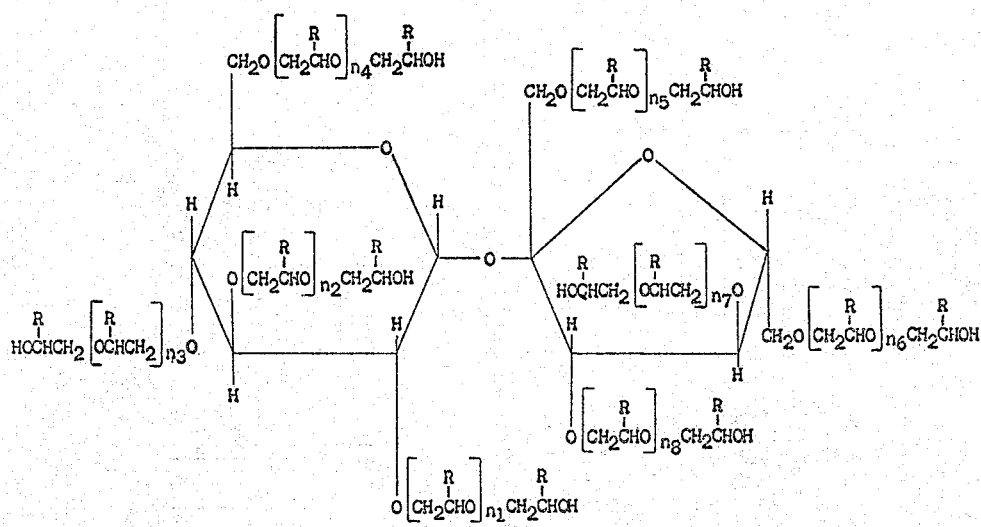

In the formula, R is —H or —$CH_3$ and $n1$, $n2$, $n3$, $n4$, $n5$, $n6$, $n7$ and $n8$ are whole numbers from 0 to 8 and their sums being in a range of about 2 to about 18, dependent upon the number of ethylene oxide or propylene oxide molecules introduced.

Some contiguous oxyalkanol groups on the sucrose skelton may also be joined at their termini by condensation reactions to form side rings. Also, it is quite possible that some of the modified sucrose molecules may become linked together by condensation between terminal hydroxyls to provide polymers which contain two, three, or even four or five units of the sucrose molecules joined together by ether linkages. All of these effects may occur concurrently.

In applicants' process, it is considered that all or most of the hydroxyl groups in the sucrose molecule react with the oxides. When R is hydrogen, all of the hydroxyls are primary.

In preparing the alkanol substituted derivatives of sucrose in accordance with the provisions of the present invention, it is preferred to employ the alkylene oxide component in substantial excess of equivalency with respect to the hydroxyls of the sucrose component. For example, it has been found that excellent polyols for use in the preparation of polyurethane resins and notably, of foamed polyurethane resins, are obtained by employing from about 10 to about 25 equivalents of the alkylene oxide, e.g., propylene oxide or ethylene oxide, per mole of the sucrose.

It is also desirable to react the alkylene oxide and the sucrose at a temperature of about 70° F. to about 270° F. If the temperature falls much below 70° F., the reaction time becomes excessively long and if the temperature is increased substantially above 270° F., there is a tendency to hydrolyze the alkylene oxide component and to thus form by-products at the expense of the main product.

It is desirable that the reaction between the sucrose and the alkylene oxide be conducted in the presence of water, which may be in liquid state or it may be present as water vapor or steam, dependent on the temperature of reaction. The water and sucrose are used as a mixture. The term "mixture" includes solutions, slurries and suspensions, and mixtures of water vapor and solid sucrose particles. The water will, in most instances, be used in an amount of about 5 percent to about 90 percent (percents are by weight) based upon the total weight of sucrose and water.

In most instances, the reaction is conducted under pressure, though usually the pressure does not substantially exceed an average of about 80 p.s.i. during most of the reaction. This, however, does not preclude at least short periods of higher pressure, e.g., of 200 p.s.i. or higher. Excessive pressures are undesirable, since they increase the concentration of alkylene oxide in solution and result in undesired side reactions. One such side reaction involves the partial hydrolysis of the alkylene oxide component.

It is also desirable to conduct the reaction in the presence of an oxyalkylation catalyst. Suitable catalysts comprise sodium hydroxide, potassium hydroxide, calcium hydroxide, sodium carbonate, sodium acetate, sodium methoxide, and acids, as for example, boric acid. It is considered, however, that sodium hydroxide and potassium hydroxide are especially suitable for the purposes of the present invention. The oxyalkylation catalysts may be employed in amounts in a range of about 0.15 percent to about 10 percent by weight based upon the sucrose component of the mixture being treated with alkylene oxide.

The reaction is maintained by continued application of alkylene oxide until the desired molar quantity is added. The latter point can readily be determined by weighing and the end of the reaction can be determined by reference to the pressure gauge. The viscosity of the polyether polyol is in a range of about 2000 cps. to 400,000 cps. The OH value is in a range of about 250 to about 750.

The reaction of sucrose and one or more alkylene oxides in accordance with the provisions of the present invention, in order to provide a compound in which all or most of the hydroxyl groups of sucrose are replaced by oxyalkanol groups, is illustrated by the following examples:

EXAMPLE A

In this example, the reactants comprised:

| | Parts by weight |
|---|---|
| Commercial granulated sugar (1.6 moles) | 550 |
| Water (27 percent of the water-sucrose mixture) | 205 |
| Sodium hydroxide (1.5 percent based upon the sucrose) | 8.25 |
| Ethylene oxide [1] (32 moles) | 1406 |

[1] Mole ratio of ethylene oxide to sucrose is 1 to 20.

The apparatus employed was an autoclave equipped with an agitator, means to heat the mixture or to cool the same as required, and other conventional appurtenances. In charging the reaction mixture into the autoclave, the sodium hydroxide was dissolved in 100 grams of water. This solution together with the remaining 105 grams of water, was added to the sucrose in the autoclave. Agitation was started and the system was flushed with nitrogen gas to remove air. The autoclave was slowly heated to 105° F. The ethylene oxide was then bubbled into the solution of sucrose in water as uniformly as possible, over a period of 5 hours and 45 minutes.

After 55 minutes of addition of ethylene oxide, an exothermal rise was observed and this was controlled by cooling, the temperature being maintained within an average range of 110° F. to 122° F., though during the exotherm, the temperature did rise to 128° F. and the pressure at this point amounted to 60 p.s.i. At the end of the addition of ethylene oxide, the pressure was only 24 p.s.i. The temperature was kept at 110° F. to 122° F. for 1 hour and 45 minutes after all of the ethylene oxide had been added. At the conclusion of the latter period, the pressure was 6 p.s.i. The heat was then turned off, it being considered that reaction was substantially complete. The autoclave was cooled until the pot temperature dropped to 60° F. and agitation was continued 5 hours and 45 minutes longer.

The product was drained from the autoclave and the latter was rinsed with 859 parts by weight of water, and the rinsings were then added to the product solution. The resultant solution was of a solids content of 63.2 percent.

The total time in the autoclave in the temperature range of about 110° F. to about 122° F. was 7 hours and 30 minutes.

For purposes of removing caustic from the solution, the latter was treated with ion exchange resin until the pH value was reduced to the neutral point, or below. The ion exchange resin was removed by filtration and the water was evaporated off from the product under vacuum and at a temperature of about 80° C. to 90° C. For purposes of further stripping off water, 258 parts by weight of toluene were added and the mixture was azeotropically distilled to remove 4.5 parts by weight of additional water. The final pot temperature in the distillation was 128° C. The toluene was in turn distilled off under vacuum, the product being heated to a temperature of 100° C. under a vacuum of 10 millimeters of mercury (absolute) for 2 hours.

The product was of light yellow color, but for purposes of further decolorization, was heated to 75° C. and mixed with 76.1 parts by weight of activated diatomaceous earth, and the resultant mixture was then filtered.

The characteristics of the product were as follows:

Yield _____ 1901 parts by weight (97 percent).
Water content _____ 0.114 percent.
Viscosity _____ 4050 cps. at 25° C.
Color value _____ 3–4 (Gardner).
Hydroxyl value ____ 415.9.
Volatile content [1] __ Less than 1 percent.

[1] Volatile content is determined at 200° C. under 5–10 mm. for 30 minutes.

The pH value upon the basis of 50 percent solids was 6.2.

The product was substantially incompatible in Freon 11, which is $CCl_3F$. It was compatible with toluene diisocyanate.

EXAMPLE B

The reaction apparatus employed in each instance corresponded to that already described, and the techniques of operation as outlined in Example A were substantially adhered to. The essential data are as follows:

*Table A*

SUCROSE-ETHYLENE OXIDE

| No. | 1 Mole Ratio | | 2 Catalyst Percent, Sucrose | 3 $H_2O$/ Sucrose, Percent | 4 Initial Temp., °F. | 5 Temp. Range, °F. | 6 Reaction Time, Hours | 7 Yield, Percent | 8 OH | 9 Viscosity, cps. at 25° C. | 10 Calculated Molecular Weight |
|---|---|---|---|---|---|---|---|---|---|---|---|
| | S | EO | | | | | | | | | |
| 1 | 1 | 14 | NaOH 1.5 | 27 | 115 | 115-130 | 13 | 87.5 | 540.6 | 22,500 | 839 |
| 2 | 1 | 15 | NaOH 1.5 | 27 | 115 | 115-125 | 8 | 91.5 | 505.1 | 13,100 | 888 |
| 3 | 1 | 20 | NaOH 1.5 | 27 | 115 | 110-128 | 13 | 97 | 415.9 | 4,050 | 1,080 |
| 4 | 1 | 10 | NaOH 1.5 | 27 | 110 | 110-125 | 6 | 83 | 601.7 | 134,000 | 747 |
| 5 | 1 | 15 | NaOH 1.5 | 8 | 125 | 125-132 | 10.5 | 87 | 481 | 15,500 | 935 |
| 6 | 1 | 15 | NaOH 1.5 | 85 | 125 | 125-132 | 7 | 83 | 762 | 9,000 | [1] 588 |
| 7 | 1 | 18 | NaOH 1.5 | 27 | 115 | 115-128 | 11.3 | 87.5 | 486 | 6,600 | 925 |
| 8 | 1 | 14 | NaOH 1.5 | 42.3 | 125 | 120-133 | 6 | 90 | 573 | 10,400 | 788 |

[1] In No. 6 the average molecular weight is very low due to the amount (16%) of ethylene and diethylene glycol which was formed during the reaction and which has an OH value of 1144.6. The sucrose-ethylene oxide reaction product has a calculated molecular weight of 725.

The product can be combined with toluene diisocyanate or other diisocyanates of organic type recognized in the art, and reacted to form polyurethane prepolymers and resins which are useful as coatings or which are foams, dependent on the technique employed in the reaction. If the materials are to be employed as coatings, the toluene diisocyanate or other organic diisocyanate is added along with a catalyst of the reaction. The resultant polyurethane in liquid form may be spread upon surfaces of metal or wood with or without priming coatings, and baked to provide useful protective and/or decorative coatings.

If the products of this example are to be employed in the manufacture of foams, two alternative techniques are suggested. In accordance with one technique, the polyol product is mixed in accordance with the recognized procedures in the preparation of polyurethane foams, with a small amount of water, catalysts such as a tertiary amine, and an organic diisocyanate such as toluene diisocyanate, an emulsifier, and the mixture is allowed to foam to provide rigid, cellulated, resinous bodies of good strength, good (low) K factor, low density, and other desirable properties.

In accordance with a more recently developed technique, foams may also be prepared by interacting the polyol with an organic diisocyanate, such as toluene diisocyanate, in the absence of water. The resultant reaction per se does not generate carbon dioxide. In order to obtain foaming, a low boiling liquid, namely Freon 11 ($CCl_3F$), is added to the prepolymer, which is a reaction product of an excess of diisocyanate, with the polyether polyol, and the emulsifier. This mixture is added to additional polyether polyol containing a catalyst at room temperature. In warming up, the Freon vaporizes, but is entrapped in the viscous liquid to produce a fine, uniform cell structure of low density. The cells formed are closed and are well adapted to retain the Freon permanently. The foams are rigid and are of excellent K factor.

It is also permissible to form the foams by adding the Freon ($CCl_3F$) to the polyol component and then further to blend the mixture with the prepolymer component.

The use of varying proportions of a number of the reaction ingredients, such as alkylene oxide and water, has been referred to. The following example illustrates the essential data in a number of such variations.

In Table A, column 1 indicates the moles of sucrose and the alkylene oxide, the latter being the higher number and is at least 10 and may be as high as about 25; column 2 gives the percent by weight of catalyst based upon sucrose; column 3 gives the percent of water based upon the total weight of sucrose and water; column 4 gives the initial temperature in the reaction vessel; column 5 gives the temperature range occurring during the reaction; column 6 gives the elapsed time during the reaction and is based upon the time it takes for satisfaction of the hydroxyls of the sucrose by the alkylene oxides. Usually, however, for purposes of assurance, the reaction is continued for a time after the pressure drops substantially to zero or until it ceases to drop; column 7 gives the yields based upon the sucrose and alkylene oxide mixture; column 8 gives the hydroxyl values of the product; column 9 gives the viscosities in cps. of the product; column 10 gives the molecular weights, which are calculated upon the basis of the hydroxyl values.

The products are all polyols in which hydrogen atoms of all or a large majority of the hydroxyl groups of sucrose are replaced by groups or chains terminated by hydroxyls and being formed by linking on of alkylene oxide groups through ether linkages.

These several polyol derivatives of sucrose and alkylene oxide are adapted for combination with isocyanates, such as toluene diisocyanate, to form coatings. If the reaction with the isocyanate is performed in the presence of water, carbon dioxide is liberated and a foam is formed. It is also within the purview of the invention to effect foaming of the polyurethane derivative of the isocyanate and the polyol by blowing or bloating with Freon, a group of fluorochloromethanes and ethanes, e.g., Freon 11, which is $CCl_3F$. The Freon may be added while cold to the polyol diisocyanate mixture, or it can be added to the prepolymer of the polyol and isocyanate. Other Freons containing from 1 or 2 chlorine atoms and 2 or 3 fluorine atoms may be used.

In the following examples, the preparation of mixed polyols by reaction of aqueous sucrose with propylene oxide and ethylene oxide is illustrated.

EXAMPLE C

This example illustrates the preparation of a polyol from sucrose in which the hydroxyls of the sucrose are reacted first with propylene oxide and subsequently ethylene oxide is added. In this example, the reaction charge comprised:

| | |
|---|---|
| Sucrose | 1 mole. |
| Water | 17 percent based upon the total weight of sucrose and water. |
| Propylene oxide | 10 moles. |
| Ethylene oxide | 9 moles. |
| Sodium hydroxide | 1.5 percent by weight based upon the sucrose. |

In conducting the reaction, an autoclave was employed. This was equipped with means for heating, means for cooling, an agitator, means for purging out the air with nitrogen gas, and means for bubbling the alkylene oxide below the surface of the sucrose solution. In conducting the reaction, the sucrose, the water and the sodium hydroxide were charged into the autoclave and the latter was purged with nitrogen gas, was sealed and heated to about 200° F. When this temperature was attained, the addition of propylene oxide was started. The propylene oxide was added over a period of 2.5 hours. The maximum pressure was 47 p.s.i. and the maximum temperature was 225° F. The pressure ranged between 35 p.s.i. and 40 p.s.i. during most of the time required for the addition of the propylene oxide. At the conclusion of the addition of the propylene oxide, the pressure was 28 p.s.i. The temperature was then maintained at 210° F. for 1¼ hours, by the end of which time the pressure had dropped to atmospheric. The mixture was then stirred for a further period of 1 hour and cooled.

Subsequently, the reaction mixture was heated to 125° F. and the addition of ethylene oxide was started and was completed over a period of 3 hours and 50 minutes. During this addition, the maximum pressure was 45 p.s.i. and the maximum temperature was 132° F. The pressure at the conclusion of the addition of ethylene oxide was 30 p.s.i. and dropped to 8 p.s.i. over a period of about 3 hours; it then became constant. The mixture was further stirred for a period of 1 hour and 15 minutes at a temperature of 125° F. to 130° F. It was then considered that all of the ethylene oxide had reacted and the reaction mixture was drained. The yield was 2600 parts by weight as against a theoretical yield of 2778 parts by weight.

The product was neutralized in the normal manner (e.g., as in Example A). The water was then removed by distillation under vacuum and traces were removed by azeotropic distillation with 434 parts by weight of toluene.

The theoretical yield of product is 2638 parts by weight and the actual yield is 2379 parts by weight (90.5 percent).

The hydroxyl value is 436.9 as against a theoretical hydroxyl value of 342 for 100 percent yield.

The viscosity of the product is 7500 cps. at 25° C. The water content is 0.13 percent. The color value is 1- and the ash content is 12 parts per million.

In the foregoing reactions involved in the preparation of mixed polyols, the propylene oxide was reacted with the sucrose in a separate initial step and at a substantially higher temperature than is required for the reaction of the ethylene oxide component. It is contemplated to reverse this procedure, if so desired, the ethylene oxide being reacted with the sucrose in the initial step and the propylene oxide being added in a subsequent step. It is also contemplated to react the sucrose with mixtures of the ethylene oxide and the propylene oxide in a single step. References to "mixtures" of ethylene oxide and propylene oxide in the reaction with sucrose include the concurrent reaction of the sucrose with the two or the stepwise addition of one and then the other.

EXAMPLE D

This example illustrates the preparation of a mixed polyol from sucrose, ethylene oxide and propylene oxide, the sucrose and the ethylene oxide being reacted first at a relatively low temperature, and the product being subsequently reacted with propylene oxide at a higher temperature. The reactants in this procedure comprise:

| | Parts by weight |
|---|---|
| Sucrose | 684 (2 moles). |
| Water | 252 (27 percent based on the sucrose plus water). |
| Sodium hydroxide | 10.25 (1.5 percent based on the sucrose). |
| Ethylene oxide | 794 (18 moles). |
| Propylene oxide | 348 (6 moles). |

In conducting a typical reaction, the sodium hydroxide was dissolved in about one-half of the water and this solution, along with the sucrose and the remainder of the water, was introduced into an autoclave. The agitator was started and the system was purged for 2 or 3 minutes with nitrogen gas. The system was then sealed and heated to 125° F., whereupon the addition of ethylene oxide was initiated and was completed over a period of 3 hours and 14 minutes. The addition of ethylene oxide was so adjusted that the maximum pressure did not exceed 52 p.s.i. The maximum temperature did not exceed 132° F. At the conclusion of the addition of ethylene oxide, the pressure in the system was 30 p.s.i. After the completion of said addition, the autoclave was allowed to stand for a period of 6 hours, during which time the pressure dropped to 6 p.s.i. It was considered that the residual pressure was probably that of nitrogen gas still in the system.

When the pressure became substantially constant, the reaction mixture was heated to 152° F. and the addition of propylene oxide was initiated and was carried to completion within a period of 1¾ hours. During the addition, the maximum pressure was 36 p.s.i. and the maximum temperature was 160° F. At the conclusion of the addition of the propylene oxide, the pressure was 31 p.s.i. After the propylene oxide was all added, the pressure dropped over a period of 5 hours and 35 minutes to 10 p.s.i., where it remained constant over a period of 2 hours.

The autoclave was then cooled, drained and rinsed with water, the rinsings being added to the product solution to obtain a solids content of 65 percent. The weight of the solution was 2494 parts as against a theoretical weight of about 2800 parts.

For purposes of recovering the product, the solution was neutralized with an acidified cation exchange resin (Amberlite IR–120). Other methods of neutralization, e.g., acidification, could be employed. Water was then distilled from the product at a tempertaure of 105° C. to 110° C. and at a pressure of 10 to 15 millimeters of mercury (absolute) for 45 minutes. At the conclusion of the stripping operation, residual water was removed azeotropically with toluene in the manner already described.

A yield of 86.8 percent was obtained and the product was of a hydroxyl value of 532. The viscosity was 33,500 c.p.s. The residual water content was 0.146 percent. The total solids content was 99.6 percent. The color value was 5–6 on the Gardner-Holdt scale.

EXAMPLE E

In this example, 2 moles of sucrose are reacted with 20 moles of propylene oxide and 14 moles of ethylene oxide mixed together before addition to the sucrose. In conducting the reaction, the apparatus employed was an autoclave equipped as previously described.

The total charge employed was:

| | Parts by weight |
|---|---|
| Sucrose | 684 |
| Water | 140 |
| Sodium hydroxide | 10.25 |
| Premixed as a solution: | |
| Propylene oxide | 1162 |
| Ethylene oxide | 616 |

The sucrose and the water were mixed to provide a mixture containing 83 percent by weight of sucrose and 17 percent by weight of water. The sodium hydroxide was employed in an amount of 1.5 percent by weight based upon the sucrose.

The sucrose, water and caustic solution were preheated in the autoclave to 200° F. and the addition of the mixture of propylene oxide and ethylene oxide started. One-half of the total charge of oxides was added over a period of about 3 hours and 7 minutes. The maximum pressure attained during the addition was 60 p.s.i. and the maximum temperature was 225° F.

The addition of the second half of the mixture of propylene oxide and ethylene oxide required 5 hours. The maximum pressure during this interval was 65 p.s.i. Whenever the pressure tended to go above this value, the addition of the mixture of oxides was interrupted until the pressure dropped below that value.

At the conclusion of the addition of the mixture of oxides, the pressure was about 50 p.s.i. and dropped to about 29 p.s.i. over a period of 80 minutes, and then became constant.

Stirring was continued for 1¾ hours without change of pressure, which was an indication of completion of the reaction. The product in an amount of 2457 parts by weight was drained from the autoclave. The theoretical yield is 2602 parts by weight.

The product was then neutralized in the normal manner as described in Example A. The water was removed in the normal manner as described in Examples A and C. The net amount of product was 2202 parts by weight (89.5 percent of theoretical value). The theoretical hydroxyl value based upon 100 percent yield is 364. The actual hydroxyl value is 450.3. The theoretical hydroxyl value based upon the yield is 417.

The color value is 3–4. The viscosity is 10,000 cps. at 250 C. The final pH value is 3.4. The solids content is 94.4 percent.

The material contained 4.96 percent of volatile material, determined as in Example A.

EXAMPLE F

In this example are tabulated the essential data involved in the preparation of a number of different mixed polyols from various combinations comprising the three components sucrose, ethylene oxide and propylene oxide. The apparatus was the same as, or substantially the same as that of Example A.

In Table B, the headings S, PO and EO are respectively for sucrose, propylene oxide and ethylene oxide. In the data of Part 1 of the table, the propylene oxide is reacted with the sucrose first and the ethylene oxide is reacted in a subsequent stage.

In Part 2 of the table, the sucrose and the ethylene oxide are reacted first and the propylene oxide is reacted in the second stage.

In each instance, two temperature ranges are given, the first range given is that employed in the first stage and the range given last is that employed in the second stage.

The neutralization of the reaction product of the sucrose and the alkylene oxides by use of ion exchange resins has been described. It is obvious that other techniques of neutralization might be employed. For example, it is also quite feasible to neutralize excess alkali with an acid, such as dilute hydrochloric acid, phosphoric acid, sulfuric acid, or the like.

While it is preferred to employ at least some ethylene oxide in the modification of the sucrose in accordance with the provisions of the present invention, it is not precluded to employ propylene oxide alone, thus replacing hydroxyls of the sucrose only with oxypropanol groups. If the mixture of the two alkylene oxides is used, it is considered that any ratio of the oxide in respect to each other may be used, the amount of the mixture being 10 to 25 moles per 1 mole of sucrose.

EXAMPLE G

This example is illustrative of the preparation of a polyether polyol from sucrose and propylene oxide. The apparatus employed in the reaction substantially corresponded to that employed in Examples A–F. The reaction charge comprised:

| | Parts by weight |
|---|---|
| Sucrose | 684 (2 moles). |
| Water | 140 (17 percent based on the sucrose-water mixture). |
| Oxyalkylation catalyst | 10.25 (1.5 percent sodium hydroxide). |
| Propylene oxide | 1740 (30 moles). |

In conducting the reaction, the sucrose, water and sodium hydroxide were charged into the reaction vessel in the usual manner, and the reaction chamber was purged of oxygen with nitrogen. The mixture was heated to 200° F., at which point the addition of propylene oxide was initiated. The pressure during the reaction varied from zero to 60 p.s.i., but was not allowed to go above the latter value as a maximum, and the maximum

Table B (PART 1) SUCROSE-PROPYLENE OXIDE-ETHYLENE OXIDE

| No. | 1 Mole Ratio | | | 2 Catalyst percent, Sucrose | 3 H₂O/ Sucrose, percent | 4 Initial Temp., °F. | 5 Temp. Range, °F. | 6 Reaction Time, Hours | 7 Yield, percent | 8 OH | 9 Viscosity, cps. at 25° C. | 10 Calculated Molecular Weight |
|---|---|---|---|---|---|---|---|---|---|---|---|---|
| | S | PO | EO | | | | | | | | | |
| 1 | 1 | 3 | 12 | NaOH 1.5 | 27 | 155 | 155–162 / 125–130 | 14.3 | 83 | 505.2 | 17,600 | 888 |
| 2 | 1 | 10 | 5 | NaOH 1.5 | 17 | 200 | 200–216 / 125–130 | 10.3 | 91.5 | 517.0 | 18,500 | 869 |
| 3 | 1 | 10 | 15 | NaOH 1.5 | 17 | 200 | 200–230 / 125–132 | 12.0 | 91.5 | 374.9 | 2,500 | 1,198 |
| 4 | 1 | 10 | 7 | NaOH 1.5 | 17 | 200 | 200–235 / 125–130 | 10.0 | 91.5 | 488.7 | 16,200 | 919 |
| 5 | 1 | 10 | 9 | NaOH 1.5 | 17 | 200 | 200–225 / 125–132 | 9.8 | 90.5 | 436.9 | 7,500 | 1,025 |

(PART 2) SUCROSE-ETHYLENE OXIDE-PROPYLENE OXIDE

| No. | S | EO | PO | Catalyst percent, Sucrose | H₂O/ Sucrose, percent | Initial Temp., °F. | Temp. Range, °F. | Reaction Time, Hours | Yield, percent | OH | Viscosity, cps. at 25° C. | Calculated Molecular Weight |
|---|---|---|---|---|---|---|---|---|---|---|---|---|
| 1 | 1 | 9 | 3 | NaOH 1.5 | 27 | 125 | 125–130 / 150–160 | 15.0 | 86.8 | 532.1 | 33,500 | 844 | temperature was not allowed to exceed 220° F. All of the propylene oxide was added within 7½ hours.

At the conclusion of the addition of the propylene oxide, the pressure was 37 p.s.i. and then became constant at 20 p.s.i. over a period of 2 hours and 10 minutes. The reaction mixture was stirred for 2 additional hours and the pressure did not change. The autoclave was then drained. The reaction product weighed 2388 parts by weight.

The product was neutralized, water was removed under vacuum, and was then subjected to azeotropic distillation with toluene to remove water as previously described.

The actual yield was 2161 parts by weight (89.5 percent). The viscosity was 20,500 cps. at 26.5° C. The product was made up into a foam in the manner which is described in a subsequent example, and the pH value at a concentration of 50 percent was 3.5.

The subsequent examples illustrate the reaction of a liquid viscous polyol derived from sucrose with toluene diisocyanate. The products are in some instances prepolymers. In other instances, they are foams. The prepolymers may be used as intermediates in the preparation of the foams.

As illustrated in certain of the examples, foams may also be formed in a single stage operation from a mixture of a polyol from sucrose, diisocyanate and the necessary blowing agent.

In determining the amount of diisocyanate to be used to react with the polyol from sucrose, consideration is given to the hydroxyl number of the polyol. In foam there should be enough isocyanate to react with all of or most of the hydroxyls. A slight excess or deficiency of isocyanate groups may be tolerated. In prepolymers, ranges of about 3 equivalencies of diisocyanate up to about 10 equivalencies based upon the hydroxyl content of the sucrose derivative are contemplated. The isocyanate equivalency of the prepolymers will, in general, be in a range of about 100 to about 200. The isocyanate equivalency indicates the equivalent weight of prepolymer per NCO group.

EXAMPLE I

*(Prepolymer)*

The sucrose polyol derivative employed in this example is the same as number (1) in Table B and comprises sucrose in a ratio of 1 mole, ethylene oxide in a ratio of 12 moles, and propylene oxide in a ratio of 3 moles. The resultant polyol is of a viscosity of 17,600 cps.

In order to form a polyurethane derivative, herein termed a prepolymer, 786 parts by weight of toluene diisocyanate, which was a mixture of 80 percent of the 2,4-isomer and 20 percent of the 2,6-isomer, was placed in a reaction vessel equipped with a stirrer, a reflux condenser, a heating mantle, a dry air inlet, and a thermometer. The contents of the flask were heated to 60° C. under a dry air blanket.

The total amount (214 parts by weight) of mixed polyol derivative or sucrose was divided into three equal portions. The heat was removed from the reaction vessel and the first third of the polyol from sucrose was added, whereupon the temperature rose exothermally to 74° C., at which point the mixture became clear. The temperature rose to a maximum of 76° C. and then diminished.

As the temperature dropped to 65° C., the second third of the mixed polyol from sucrose was added and the temperature again rose exothermally to 80° C. As the exothermal rise subsided, the temperature again dropped, and at 65° C. the final portion of the mixed polyol was added and the temperature of the reaction mixture rose exothermally to 70° C. and was maintained at that value for ½ hour by application of external heat. The product was cooled to 60° C. and filtered through a fine cheesecloth filter.

The properties of this material were as follows:

NCO equivalent _____ 139.7
Theoretical equivalent _____ 140
Viscosity (Gardner-Holdt) _____ Y+¼
Color (Gardner) _____ 10

Similar techniques can be applied to the preparation of prepolymers of toluene diisocyanate and the polyol from sucrose and propylene oxide alone. However, lower temperatures are permissible. The mixture became clear at 50° C.

The prepolymer of the toluene diisocyanate isomers and the polyols from sucrose and ethylene oxide are very readily prepared by mixing a half of the polyol with toluene diisocyanate isomers at 80° C. and then allowing the temperature to rise exothermally to about 120° C. When the exotherm slackens, the second portion of polyol is added.

In the foregoing reaction, the 80–20 mixture of 2,4 and 2,6-isomers of toluene diisocyanate may be replaced by other mixtures, such as a 65–35 mixture, of the same isomers. The pure isomers are also contemplated. Likewise, the toluene diisocyanate may be replaced by other compounds or organic nature containing a plurality of isocyanato groups.

The prepolymer of the foregoing example may be foamed by incorporating added ingredients to provide a mixture comprising:

Prepolymer
Blowing agent (e.g., water or Freon)
Polyol
Catalyst
Emulsifier

The mixing is promoted by the use of an emulsifying agent or surfactant, such as the well-known surfactant silicone resins, as represented by the commercial products sold as "X–521" or "X–520," which have good emulsifying properties. These are polyoxyalkylene organo-silicone copolymers, X521 has the formula

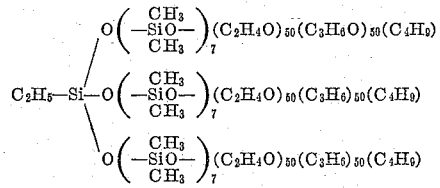

Other non-ionic emulsifying agents, such as "Pluronic P–84" and "Tetronic 904," may also be employed. "Pluronic P–84" is a block copolymer prepared by adding propylene oxide to the two hydroxyl groups of a propylene glycol nucleus and adding ethylene oxide to the resultant diol, so that the oxyethanol groups constitute 40 percent to 50 percent of the molecule. The average molecular weight is 4500. The "Tetronic 904" is the reaction product of about 40–50 percent ethylene oxide and about 40–50 percent propylene oxide, the rest of the mixture being ethylenediamine and the product having a molecular weight between 6000 and 7500.

Still other wetting agents comprise polypropylene glycol of a molecular weight between about 2000 and 3000, "Tween 40," which is a polyoxyethylene sorbitan monopalmitate, and "Triton X–100," which is an ethylene oxide condensate of an alkyl phenol. Other surfactants, of which hundreds are recognized in the art, could be used.

The polyol derivatives of sucrose and ethylene or propylene oxide, or mixtures of the two as disclosed herein, may be further blended with other polyols, if so desired, in order to form mixed polyurethane prepolymers. Since the polyols from sucrose and alkylene oxide are of very low volatility, it is usually desirable that added polyols (if any) be of similar non-volatile nature. In the latter category belong such polyols as trimethylolethane.

EXAMPLE II

*(Prepolymer)*

The use of an added polyol with the sucrose polyol and the toluene diisocyanate in forming a prepolymer is represented in this example. The components comprised:

| | Parts by weight |
|---|---|
| Toluene diisocyanate (80–20 blend) | 430 |
| Polyol from sucrose | 45 |
| Trimethylolethane (added polyol) | 25 |

In the foregoing mixture, the polyol from sucrose was from a mixture comprising 1 mole of sucrose and 14 moles of ethylene oxide (Table A); this polyol is soluble in hot toluene diisocyanate.

In conducting the reaction to form the prepolymer, the toluene diisocyanate was heated to 82° C. in an appropriate container, having the appurtenances described in the last example. All of the sucrose-ethylene oxide polyol was added at one time and the temperature rose to 96° C., at which point the mixture became clear. The mixture was then permitted to cool to 75° C. and the trimethylolethane was added as a finely powdered solid, and the temperature rose to 103° C. The clear reaction mixture was allowed to cool to 90° C. and was held at that temperature for 1 hour. The mixture was allowed to cool to 60° C. and was then filtered through a nylon filter cloth. The properties of the prepolymer product were as follows:

| | |
|---|---|
| NCO equivalent | 128.3 |
| Theoretical equivalent | 128 |
| Viscosity (Gardner-Holdt) | V |
| Color (Gardner) | 10–11 |

This prepolymer was useful in forming coatings and also may be foamed and cured, as described in subsequent Example III.

EXAMPLE III

*(Foam)*

This example is illustrative of the preparation of foam by the prepolymer technique, using a polyol derived from 1 mole of sucrose and 14 moles of ethylene oxide, as illustrated by number (1) in Table A. The prepolymer of this polyol comprised 78.5 parts by weight of toluene diisocyanate and 21.5 parts by weight of the polyol. The techniques of Example I were used in forming the prepolymer.

The prepolymer was made up into package A comprising:

| | Parts by weight |
|---|---|
| Prepolymer | 100 |
| Emulsifier (X–521) | 1 |
| Blowing agent (CCl$_3$F) | 28 |

| Package B comprised: | Parts by weight |
|---|---|
| Polyol | 79.5 |
| Catalyst (dimethylethanolamine) | 0.6 |

The two packages were mixed, foamed and cured in the manner described in Example IV to follow.

The properties of the foam were as follows:

| | |
|---|---|
| Set time | 125 seconds. |
| Density | 2.03 lbs./cu. ft. |
| Closed cells | 87.5 percent. |
| Compression (25%) | 19.1 p.s.i. |
| Heat resistance, 17 hours, 250° F. | 2–3% expansion, hard foam, good resistance. |
| Humidity resistance, 24 hours, 150° F., 100% relative humidity | 2–4% expansion, hard foam, good resistance. |
| K factor (probe method)[1] | Zero aging 0.124, 14 days aging 0.153. |

[1] The K values were determined by the D'Eustachio and Schreiner method described in the American Society of Heating and Ventilating Engineering, Transactions 58–331 (1952). ASTM Method 177–45 could also be used.

The foam is rigid and of closed cells.

EXAMPLE IV

This example is illustrative of the preparation of a foam by the prepolymer method, using a polyol derived by reacting sucrose and a single alkylene oxide. The polyol comprised 1 mole of sucrose, 15 moles of ethylene oxide, as in number (2) of Table A. A prepolymer was made up comprising this polyol, trimethylolethane and toluene diisocyanate, as described in Example II.

Package A was formulated comprising:

| | Parts by weight |
|---|---|
| Prepolymer | 100 |
| Emulsifier (X–521) | 1 |
| Blowing agent (CCl$_3$F) | 28 |

Package B of the foam comprised:

| | Parts by weight |
|---|---|
| Sucrose polyol (same as in prepolymer) | 79.5 |
| Catalyst (dimethylethanolamine) | 0.6 |

Package A was cooled to 55° F. and blended with Package B. The two packages, after they were blended, were poured into an open mold and permitted to foam.

The mixture foamed and set in 120–130 seconds and was then cured at 150° F. for 20 minutes. The properties of the product were:

| | |
|---|---|
| Density | 2.26 lbs./cu. ft. |
| Closed cells | 95.5 percent. |
| Heat resistance, 350° F., 17 hours | 1–2% expansion, hard foam, no distortion. |
| Moisture resistance, 150° F., 24 hours, 100% relative humidity | 2–4% expansion, good resistance. |
| K factor (after 7 days) | 0.146. |

The product was a closed cell, rigid foam of high water resistance.

EXAMPLE V

*(Foam)*

The base material is a prepolymer substantially corresponding to that of Example I. One package (A) was made up comprising:

| | Parts by weight |
|---|---|
| Prepolymer | 100 |
| Emulsifier (X–521) | 1 |
| Freon 11 | 28 |

A second package (B) was made up comprising:

| | Parts by weight |
|---|---|
| Polyol of sucrose (1 mole sucrose-12 moles ethylene oxide-3 moles propylene oxide) | 79.5 |
| Dimethylethanolamine (catalyst) | 0.6 |

The first package was mixed and cooled to 55° F. The second package was likewise mixed thoroughly, but was not cooled. The two packages were mixed together and poured into an appropriate mold. The mixture was allowed to foam in the mold and was cured by heating the same for 20 minutes at 150° F. A good foam product of low density was obtained.

The properties of the foam were as follows:

| | |
|---|---|
| Set time | 100–110 seconds. |
| Density | 2.12 lbs./cu. ft. |
| Closed cells | 85.4 percent. |
| 25% compression strength | 31 p.s.i. |
| Tensile strength | 36 p.s.i. |
| K factor (probe method) | 0.142. |
| Heat resistance, 250° F., 17 hours | Hard foam, 6–9% expansion. |
| Humidity resistance, 150° F., 100% relative humidity | Foam hard, 2–4% expansion. |

The foam was of closed cells and was rigid.

EXAMPLE VI

*(Foam)*

In this example, water was reacted with isocyanato groups in the prepolymer to generate carbon dioxide for foaming the mixture.

The polyol employed was of 1 mole of sucrose, 10 moles of propylene oxide and 5 moles of ethylene oxide, corresponding to number (2) of Table B.

A prepolymer of this polyol was prepared comprising 79 parts by weight of toluene diisocyanate mixed (80–20) isomers and 21 parts by weight of the polyol, using the techniques already described. One hundred parts of this prepolymer were used as one component of a foamable mixture and this component was mixed for 20 seconds with a second component comprising:

| | Parts by weight |
|---|---|
| Polyol (same as foregoing) | 43.8 |
| Emulsifier (X–521) | 1.0 |
| Water | 2.7 |
| Catalyst (dimethylethanolamine) | 0.3 |

The mixture was poured into a mold. The mixture foamed and gelled in 115 seconds. The foam was cured at 150° F. for 30 minutes.

A non-friable foam having the following characteristics resulted:

| | |
|---|---|
| Density | 1.71 lbs./cu. ft. |
| 25% compression strength | 38.1 p.s.i. |
| Closed cells | 79.7 percent. |

The foam was of closed cells and was rigid. When heated at 250° F. for 20 minutes, there was 1 percent to 2 percent expansion. The test sample remained hard and there was no distortion.

EXAMPLE VII

*(Foam)*

In accordance with the provisions of this example, a foam was prepared using $CCl_3F$ as a blowing agent and in a single stage operation from a polyol comprising:

| | | |
|---|---|---|
| Sucrose | moles | 1 |
| Propylene oxide | do | 10 |
| Ethylene oxide | do | 5 |

This polyol corresponded to number (2) in Table B. This polyol was made up into the following foamable mixture:

| | Parts by weight |
|---|---|
| Polyol | 100 |
| Emulsifier (X–521) | 1 |
| Catalyst (dimethylethanolamine) | 1 |
| Blowing agent ($CCl_3F$) | 28 |

This mixture, employed as component A, was cooled to 55° F. and to the same was added 80.2 parts by weight of toluene diisocyanate (80–20 mixed isomers). The two components were stirred together for 20 to 40 seconds and were then poured into an appropriate mold. The set time for the mixture was 205–210 seconds. The mixture was cured for 24 hours at 80° F. to provide a fine celled polyurethane rigid foam of a density of 1.91 pounds per cubic foot. The 25 percent compression strength was 23 p.s.i. The tensile strength was 23.4 p.s.i. The foam was heat resistant at 250° F. with 0 percent to 3 percent heat expansion. The expansion at 100 percent relative humidity at 150° F. was 3 percent to 9 percent. The proportion of closed cells was 84.2 percent.

EXAMPLE VIII

*(Foam)*

This example is further illustrative of the preparation of a polyurethane resin foam from a sucrose polyol and toluene diisocyanate by the prepolymer method.

The starting polyol comprised 1 mole of sucrose, 9 moles of ethylene oxide and 3 moles of propylene oxide. The polyol corresponds to number (1) in Part 2, Table B. The prepolymer comprised:

| | Parts by weight |
|---|---|
| Polyol | 19.8 |
| Toluene diisocyanate (80–20 mixture) | 80.2 |

These were reacted in substantially the manner described in Example I to form the prepolymer.

A first package was then made up comprising:

| | Parts by weight |
|---|---|
| Prepolymer | 100 |
| Emulsifier (X–521) | 1 |
| Blowing agent ($CCl_3F$) | 28 |

This mixture was cooled to 55° F. and was blended. The second package comprised:

| | Parts by weight |
|---|---|
| Polyol (same as above) | 77.0 |
| Catalyst (dimethylethanolamine) | 0.6 |

The two components were mixed thoroughly for 25 seconds and were poured into an open mold. The mixture foamed and set in 115–120 seconds and was cured by heating at 150° F. for 20 minutes.

The product was a good foamed polyurethane resin characterized by the following properties:

| | |
|---|---|
| Density | 1.90 lbs./cu. ft. |
| Closed cells | 85.3 percent. |
| Compression strength (25% set) | 23 p.s.i. |
| K value (probe method) | 0.148. |
| Heat resistances, 250° F., 17 hours | Foam is hard, 0–3% expansion, no distortion. |
| Moisture resistance, 150° F., 24 hours, 100% relative humidity | Foam is hard, 3–9% expansion, no distortion. |

The foam was of closed cells and was rigid.

EXAMPLE IX

*(Foam)*

This example illustrates the preparation of a Freon blown foam from a polyol in which the sucrose component was reacted simultaneously with propylene oxide and ethylene oxide in solution in each other. The polyol was substantially the same as that of Example E.

A prepolymer was prepared from this polyol comprising 78 parts by weight of toluene diisocyanate and 22 parts by weight of the polyol.

A foamable charge was made up from the prepolymer in the manner already described, and comprised:

| | Parts by weight |
|---|---|
| Prepolymer | 100 |
| $CCl_3F$ | 30 |
| Polyether (same polyether as in prepolymer) | 88 |
| Emulsifier (silicone X–521) | 1 |
| Catalyst (dimethylethanolamine) | 1 |

The foregoing mixture was foamed and cured at 150° F. to provide a good foam of fine cell structure, having a density of 2.23 pounds per cubic foot. The foam had 87 percent closed cells and was rigid.

EXAMPLE X

*(Foam)*

This example illustrates the preparation of a Freon blown foam from a prepolymer of toluene diisocyanate and a polyol. The polyol component was made up by reacting 1 mole of sucrose and 15 moles of propylene oxide, in the presence of water and sodium hydroxide, to a viscosity of 20,500 cps. and to a hydroxyl value of 503.3. This material was the same as that described in Example G.

The prepolymer was made up from 78.5 parts by weight of toluene diisocyanate (80–20 mixture) and 21.5 parts by weight of the polyol. The resultant mixture was treated in the manner described to provide the prepolymer. In order to form the foam, a charge was prepared comprising:

| | Parts by weight |
|---|---|
| Prepolymer | 100 |
| $CCl_3F$ | 30 |
| Polyol (same as in the prepolymer) | 75 |
| Emulsifier (silicone X–521) | 1 |
| Catalyst (dibutyl tin dilaurate) | 0.8 |

These components were mixed in the usual manner and were foamed and cured at a temperature of 150° F. In foaming and curing the mixture, an open container was employed. The resultant product was of excellent, fine cell structure and of a density of 1.99 pounds per cubic foot. The proportion of closed cells in this rigid foam was 85.9 percent.

EXAMPLE XI
(Foam)

This example is illustrative of the preparation in a single stage of a foam from a polyol of sucrose, propylene oxide and ethylene oxide, in which the foaming action is produced by the interaction of toluene diisocyanate and water to generate carbon dioxide.

The polyol component was prepared from a mixture of 1 mole of sucrose, 12 moles of propylene oxide and 5 moles of ethylene oxide. The techniques were the same as already described. The resultant polyol was of a viscosity of 15,500 cps. and a hydroxyl number of 461. The foamable mixture comprised:

| | Parts by weight |
|---|---|
| Polyol | 100 |
| Water | 2 |
| Emulsifier (silicone X–521) | 1.5 |
| Catalyst (dimethylethanolamine) | 0.5 |
| Toluene diisocyanate (80–20 mixture) | 91 |

The mixture was formed from two packages, one containing the polyol, the catalyst, water and emulsifier, and the other containing the toluene diisocyanate mixed isomers, as illustrated in Example VI.

The components were mixed at high speed for 20–25 seconds and were foamed in an open container. A rapid generation of carbon dioxide to produce foaming was obtained. The product was then cured at 150° F. to provide a hard, tough foam of a density of 2–3 pounds per cubic foot.

EXAMPLE XII

This example is illustrative of the preparation of a foam using Freon and water to produce the blowing action.

In the preparation, a polyether polyol comprising 1 mole of sucrose, 10 moles of propylene oxide and 5 moles of ethylene oxide was prepared. The prepolymer was made up comprising 79 parts by weight of toluene diisocyanate mixed isomers (80–20 blend) and 21 parts by weight of polyol.

A first package (A) was then made up comprising:

| | Parts by weight |
|---|---|
| Prepolymer | 100 |
| Emulsifier (pluronic 84) | 1 |
| Blowing agent ($CCl_3F$) | 15 | and a second package (B) was made up comprising:

| | Parts by weight |
|---|---|
| Polyol (same as above) | 63 |
| Catalyst (dimethylethanolamine) | 1 |
| Water | 1.2 |

The first package was added to the second and the mixture was stirred for 25 seconds. The mixture foamed and was cured at 150° F. for ½ hour to provide a good, non-friable, cellulated body having the following characteristics:

| | |
|---|---|
| Set time | 110–115 seconds. |
| Closed cells | 84.1 percent. |
| Compression strength | 32.7 p.s.i. |
| Tensile strength | 30.4 p.s.i. |
| Heat resistance, 17 hours, 250° F. | Hard foam, no distortion or expansion. |
| Humidity resistance, 24 hours at 150° F., 100% relative humidity | Hard foam, no distortion or expansion. |
| Type of foam | Rigid. |

EXAMPLE XIII

This example illustrates the preparation of a foam from a polyether polyol and an organic diisocyanate in a single stage reaction by the simultaneous gassing action of water and a carbon halide. The polyether polyol comprised 10 moles of propylene oxide and 7 moles of ethylene oxide, and was of the type previously illustrated as number (4) in Table B of the specification. The reaction mixture was made up as two separate packages, the first being of the following composition:

| | Parts by weight |
|---|---|
| Polyether polyol | 100 |
| Emulsifier (silicone X–521) | 1 |
| Catalyst (dimethylethanolamine) | 0.5 |
| Distilled water | 1.2 |
| Carbon halide ($CCl_3F$) | 15 |

This package was stirred rapidly by a mechanical mixer at a temperature of 55° F. for 10 seconds. To the foregoing package was quickly added 87 parts by weight of toluene diisocyanate (80–20 mixed isomers) and the mixture was stirred rapidly by a mechanical mixer for 20 seconds. The mixture was then poured into an open container. The foaming and setting time was 105–110 seconds. The mixture, when foamed and set, was cured in an oven for 20 minutes at 150° F. The resultant foam was of a density of 1.95 pounds per cubic foot, was composed of fine, uniform cells, and 86.3 percent of the cells were closed. The foam was rigid and non-friable.

In the foregoing examples, polyurethane foams have been described as being rigid and as having closed cells. This indicates that the foams have an elongation of from near zero percent to perhaps 2 or 3 percent, are hard and non-yielding, and will strongly resist compression. Even a very low density foam will have a compression strength of 15 or 20 p.s.i. Rigid foams of a density of 4 pounds per cubic foot will have a compression strength of 60 or 70 p.s.i.

EXAMPLE XIV

This example illustrates the preparation of films from a mixture comprising a polyisocyanate and a polyol from 1 mole of sucrose and 15 moles of ethylene oxide. This example also illustrates the fact that the reaction of the polyols of this invention and polyisocyanates does not necessarily require the use of a catalyst.

The polyol employed in this example comprised 15 moles of ethylene oxide per mole of sucrose.

A prepolymer was prepared in the manner already described and comprising 85 parts by weight of toluene diisocyanate (80–20 mixed isomers), 15 parts by weight of polyol from 1 mole of sucrose and 15 moles of ethylene oxide, and 5 parts by weight of trimethylolethane.

To 25 parts by weight of this prepolymer was added 21.5 parts by weight of the same polyol. No catalyst was used. The resultant liquid mixture was spread as films upon panels of tin. On one set of panels the films were of 10 mils thickness. The films dried hard overnight at room temperature.

A second set of panels were coated with films of 2 mils thickness. These films were cured in a vacuum oven.

A third set of panels were coated with films of 3 mils thickness and the films were dried in an oven overnight at 46° C.

Although specific examples of the invention have been set forth hereinabove, it is not intended to limit the invention solely thereto, but to include all of the variations and modifications included within the scope of the following claims.

We claim:
1. A prepolymer of an organic diisocyanate and a polyol, the prepolymer being of an isocyanate equivalency of about 100 to about 200 and the polyol being, of the structure:

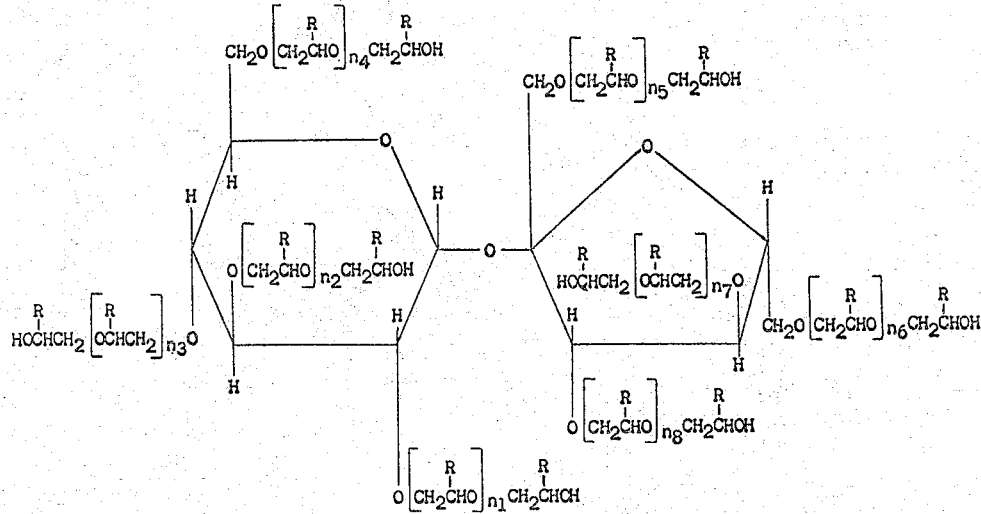

in which R is selected from the class consisting of H and $CH_3$, and $n_1$, $n_2$, $n_3$, $n_4$, $n_5$, $n_6$, $n_7$ and $n_8$ are whole numbers from 0 to 8, and their sums being in a range from 2 to about 18.

2. As a new material, a polyurethane which is the reaction product of an organic polyisocyanate and a polyether polyol of the formula:

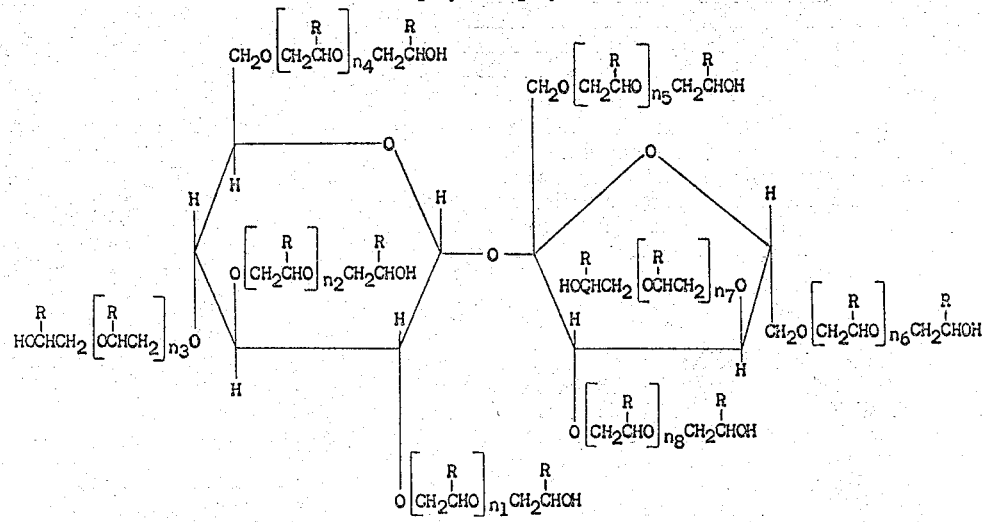

in which R is selected from the class consisting of H and $CH_3$, and $n_1$, $n_2$, $n_3$, $n_4$, $n_5$, $n_6$, $n_7$ and $n_8$ are whole numbers from 0 to 8, and their sums being in a range from 2 to about 18.

3. A method of forming a rigid foamed polyurethane resin of a polyether polyol of sucrose, the polyol being essentially of the structure:

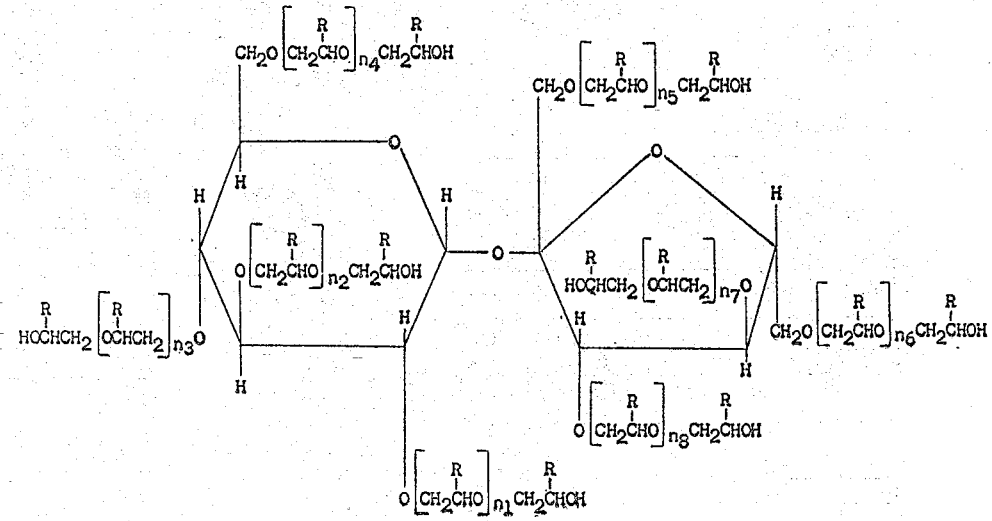

wherein R is selected from the class consisting of H and CH$_3$, and $n_1$, $n_2$, $n_3$, $n_4$, $n_5$, $n_6$, $n_7$ and $n_8$ are whole numbers from 0 to 8, and their sums being in a range from 2 to about 18, which comprises:
(I) preparing a liquid prepolymer of—
  (A) a part of said polyether polyol of sucrose and
  (B) an organic isocyanate containing a plurality of isocyanato groups,
(II) adding to the prepolymer—
  (C) a further amount of said polyether polyol of sucrose substantially equivalent to the isocyanato groups of said prepolymer,
  (D) a fluorochloromethane blowing agent for foamed polyurethane resin formation,
  (E) a catalyst of urethane formation and
  (F) an emulsifying agent, and
(III) allowing the mixture to foam and set to form said foamed polyurethane resin.

4. A method of forming a rigid foamed polyurethane resin of a polyether polyol of sucrose, the polyol being of the structure:

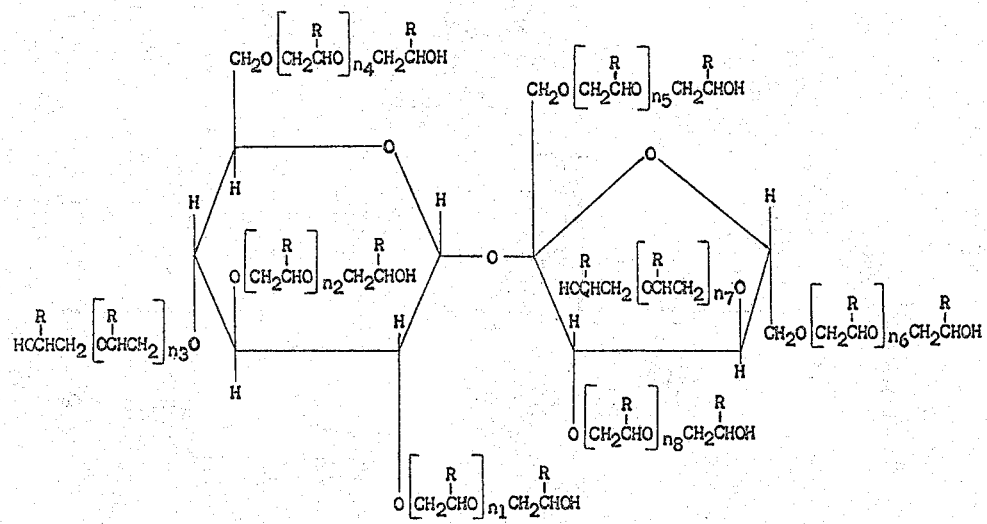

wherein R is selected from the class consisting of H and CH$_3$, and $n_1$, $n_2$, $n_3$, $n_4$, $n_5$, $n_6$, $n_7$ and $n_8$ are whole numbers from 0 to 8, and their sums being in a range from 2 to about 18, which comprises:
(I) preparing a liquid prepolymer of—
  (A) a part of said polyether polyol of sucrose and
  (B) an organic isocyanate containing a plurality of isocyanato groups,
(II) adding to the prepolymer—
  (C) a further amount of said polyether polyol of sucrose substantially equivalent to the isocyanato groups of said prepolymer,
  (D) water as a blowing agent for urethane resin foam formation,
  (E) a catalyst of urethane formation and
  (F) an emulsifying agent, and
(III) allowing the mixture to foam and set to form said foamed polyurethane resin.

5. A method of forming a rigid foamed polyurethane resin of a polyether polyol of sucrose, the polyol being of the structure:

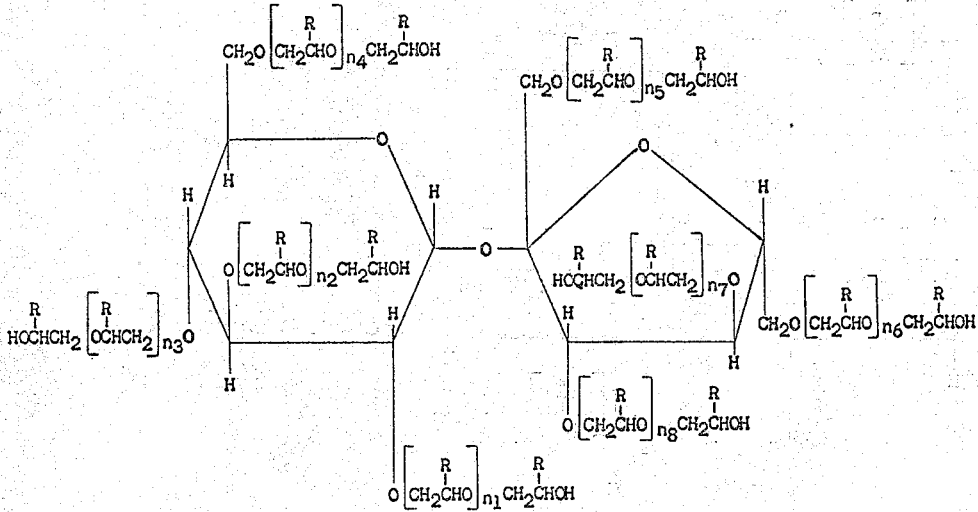

wherein R is selected from the class consisting of H and CH$_3$, and $n_1$, $n_2$, $n_3$, $n_4$, $n_5$, $n_6$, $n_7$ and $n_8$ are whole numbers from 0 to 8, and their sums being in a range from 2 to about 18, which comprises:
(I) preparing a liquid prepolymer of—
  (A) a part of said polyether polyol of sucrose and
  (B) an organic isocyanate containing a plurality of isocyanato groups,
(II) adding to the prepolymer—

(C) a further amount of said polyether polyol of sucrose substantially equivalent to the isocyanato groups of said prepolymer,
(D) a blowing agent selected from the group consisting of water, a volatile fluorochloromethane and a volatile fluorochloroethane,
(E) a catalyst of urethane formation and
(F) an emulsifying agent, and
(III) allowing the mixture to foam and set to form said foamed polyurethane resin.

6. A method of preparing a prepolymer containing available isocyanato groups, which comprises mixing:

(I) a compound of sucrose which is polyether polyol having the formula—

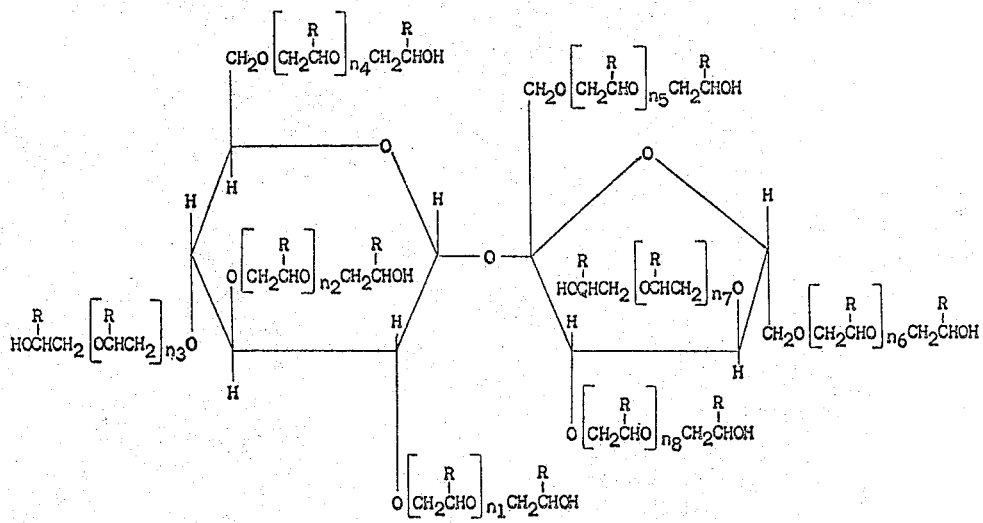

wherein R is selected from the class consisting of H and $CH_3$, and $n_1$, $n_2$, $n_3$, $n_4$, $n_5$, $n_6$, $n_7$ and $n_8$ are whole numbers from 0 to 8, and their sums being in a range from 2 to about 18, and an added liquid polyhydric alcohol with
(II) toluene diisocyanate, the latter compound being present in substantial excess of equivalency with respect to the hydroxyls of the polyols.

7. The method according to claim 6 in which the added liquid polyhydric alcohol is selected from the class consisting of glycerine, pentaerythritol, trimethylolpropane, trimethylolethane and 1,2,6-hexanetriol.

8. The method of forming a rigid foamed polyurethane product which comprises mixing:
(I) the prepolymer as defined in claim 1 with
(II) and added polyol having the structure—

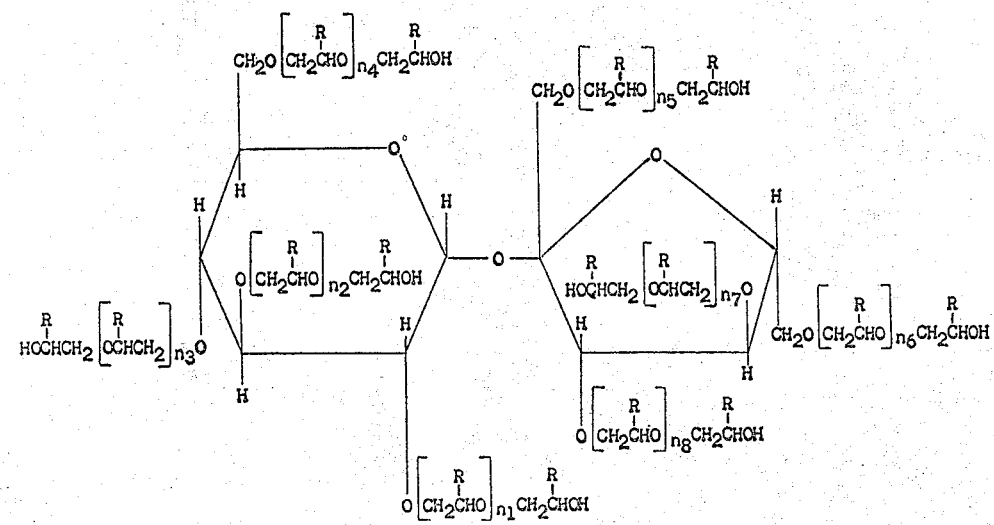

wherein R is selected from the class consisting of H and $CH_3$, and $n_1$, $n_2$, $n_3$, $n_4$, $n_5$, $n_6$, $n_7$ and $n_8$ are whole numbers from 0 to 8, and their sums being in a range from 2 to about 18,
(III) a catalyst of urethane formation, (IV) an emulsifying agent,
(V) a blowing agent which is selected from the class consisting of water, a volatile fluorochloromethane and a volatile fluorochloroethane, and allowing the mixture to foam and set.

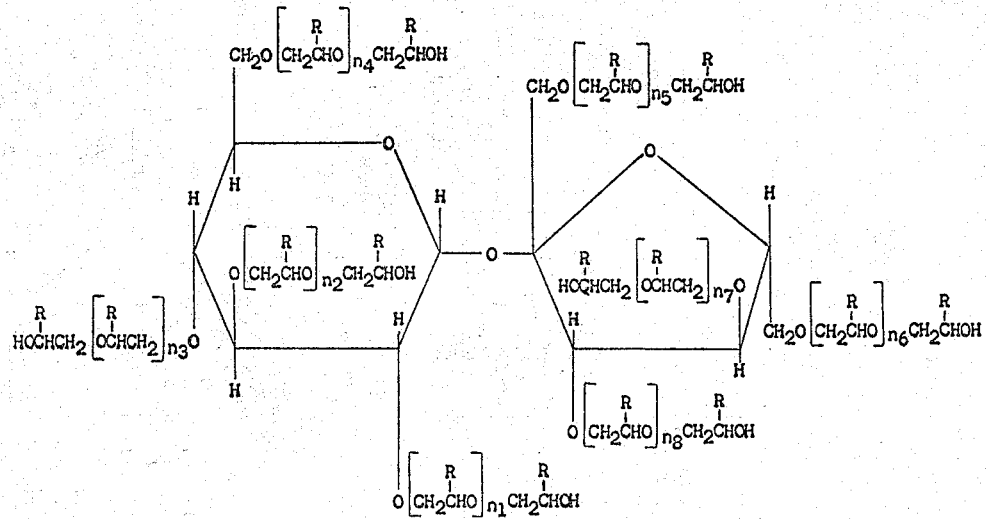

9. The foam product as obtained by the method of claim 8.

10. A method of forming a polyurethane which comprises reacting an organic polyisocyanate with an approximate equivalency with respect to the isocyanato groups of a polyol of sucrose having the formula:

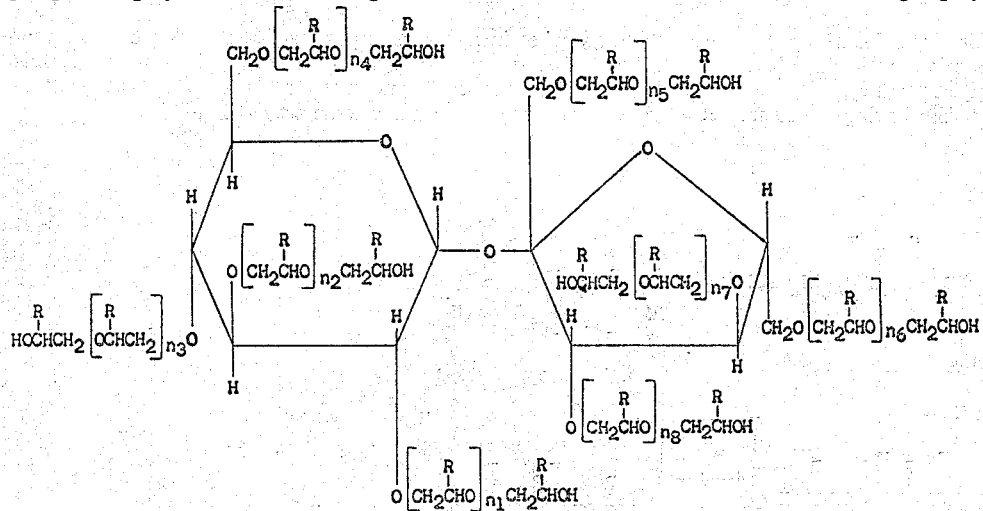

wherein R is selected from the class consisting of H and CH$_3$, and $n_1$, $n_2$, $n_3$, $n_4$, $n_5$, $n_6$, $n_7$ and $n_8$ are whole numbers from 0 to 8, and their sums being in a range from 2 to about 18.

11. A method of forming a polyurethane which comprises reacting an organic polyisocyanate with a polyol of sucrose having the formula:

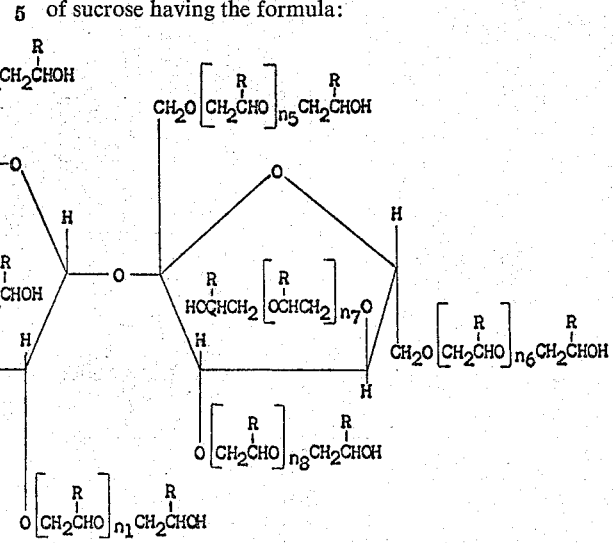

wherein R is selected from the class consisting of H and CH$_3$, and $n_1$, $n_2$, $n_3$, $n_4$, $n_5$, $n_6$, $n_7$ and $n_8$ are whole numbers from 0 to 8, and their sums being in a range from 2 to about 18.

12. A method of forming a polyurethane which comprises reacting an organic polyisocyanate with a polyol of sucrose having the formula:

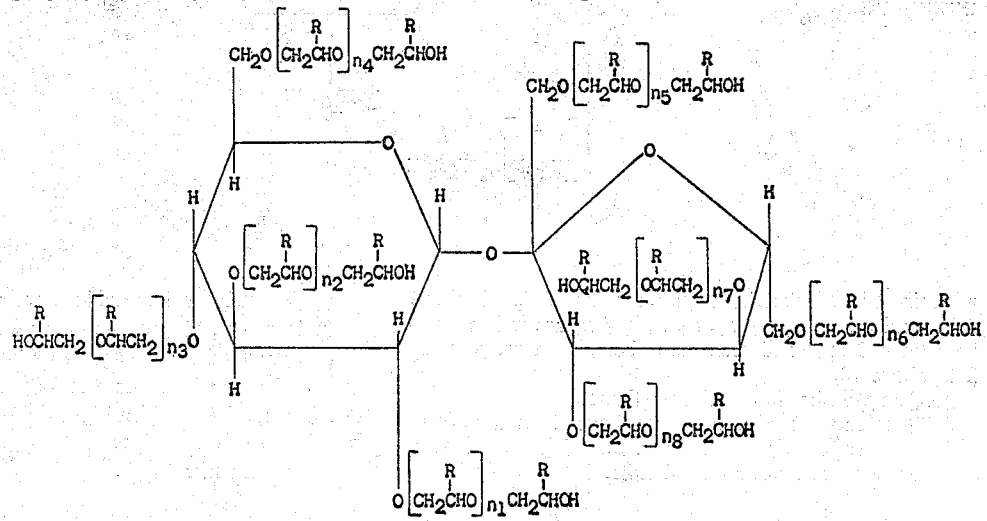

wherein $n_1$, $n_2$, $n_3$, $n_4$, $n_5$, $n_6$, $n_7$ and $n_8$ are whole numbers from 0 to 8, and their sums being in a range from 2 to about 18, and wherein some of the groups R are hydrogen atoms and some are —$CH_3$.

14. A method of forming a foamed polyurethane polymer which comprises mixing:
(I) an organic polyisocyanate,
(II) a polyol of sucrose having the structure—

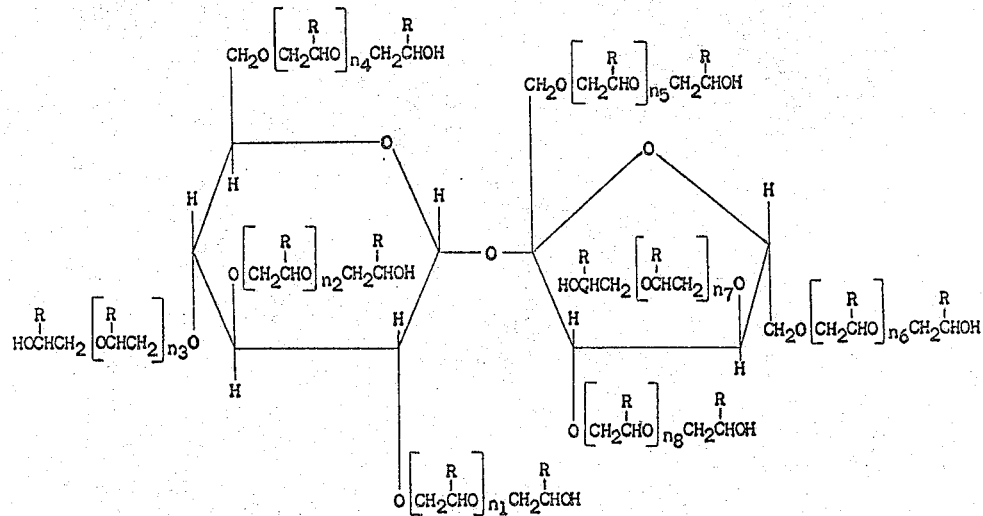

13. A method of forming a foamed polyurethane polymer which comprises mixing:
(I) an organic polyisocyanate,
(II) a polyol of sucrose having the structure:

wherein $n_1$, $n_2$, $n_3$, $n_4$, $n_5$, $n_6$, $n_7$ and $n_8$ are whole numbers from 0 to 8, and their sums being in a range from 2 to about 18, and wherein some of the groups R are hydrogen atoms and some are —$CH_3$,

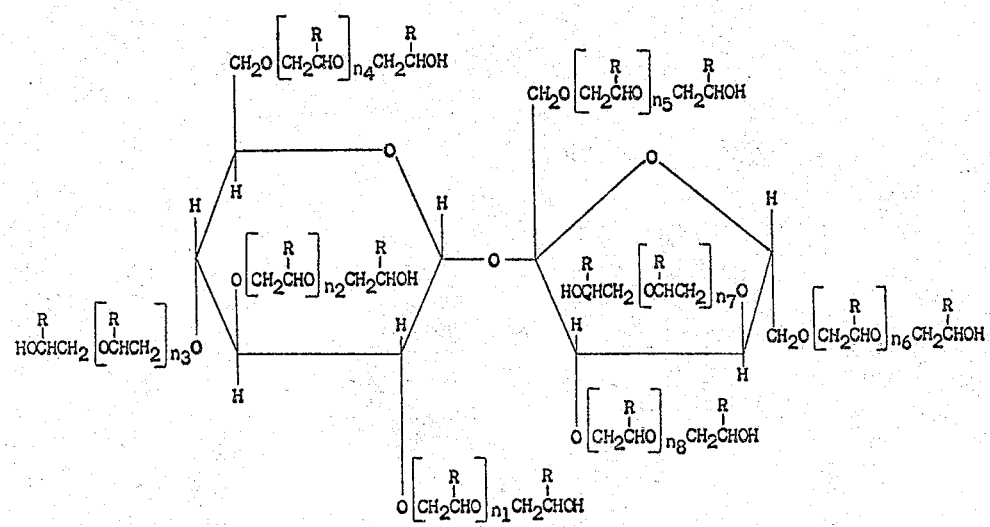

wherein R is selected from the class consisting of H and $CH_3$, and $n_1$, $n_2$, $n_3$, $n_4$, $n_5$, $n_6$, $n_7$ and $n_8$ are whole numbers from 0 to 8 and their sums being in a range from 2 to about 18,
(III) a volatile fluorochloromethane,
(IV) a catalyst promoting urethane formation and
(V) an emulsifying agent, and allowing the mixture to foam and cure to a solid state.

(III) a volatile fluorochloromethane,
(IV) a catalyst promoting urethane formation and
(V) an emulsifying agent, and allowing the mixture to foam and cure to a solid state.

15. A method of forming a rigid foamed polyurethane which comprises mixing:
(I) an organic polyisocyanate, (II) a polyol component consisting essentially of a polyol of sucrose having the structure—

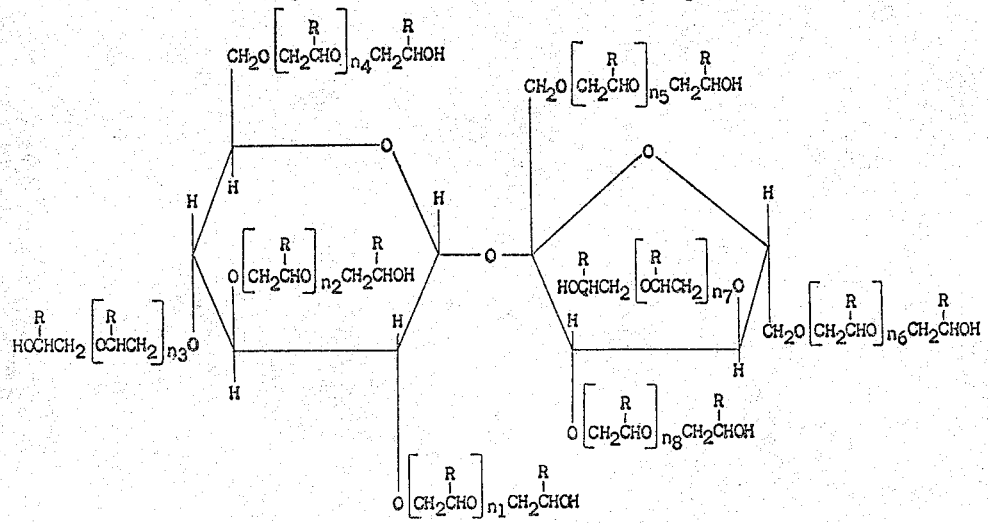

wherein $n_1$, $n_2$, $n_3$, $n_4$, $n_5$, $n_6$, $n_7$ and $n_8$ are whole numbers from 0 to 8 and their sums being in a range from 2 to about 18, and wherein some of the groups R are hydrogen atoms while others are —$CH_3$ groups, and (III) a volatile fluorochloromethane blowing agent, and allowing the mixture to foam and cure to a solid state.

References Cited by the Examiner

UNITED STATES PATENTS

| | | | |
|---|---|---|---|
| 2,606,186 | 8/52 | Dean et al. | 260—210 |
| 2,616,889 | 11/52 | Velluz et al. | 260—210 |
| 2,764,565 | 9/56 | Hoppe et al. | 260—2.5 |
| 2,843,568 | 7/58 | Benning et al. | 260—77.5 |
| 2,866,774 | 12/58 | Price | 260—77.5 |
| 2,888,413 | 5/59 | Pace | 260—2.5 |
| 2,902,478 | 9/59 | Anderson | 260—209 |
| 2,949,431 | 8/60 | Britain | 260—2.5 |
| 2,962,455 | 11/60 | Hostettler et al. | 260—2.5 |
| 3,042,666 | 7/62 | Gentiles | 260—2.5 |
| 3,072,582 | 1/63 | Frost | 260—2.5 |
| 3,094,494 | 6/63 | Hopkins et al. | 260—2.5 |

FOREIGN PATENTS 1,161,239  3/58  France.

OTHER REFERENCES

C & EN, vol. 35, No. 22, June 3, 1957, page 90.

LEON J. BERCOVITZ, *Primary Examiner.*

D. ARNOLD, *Examiner.*